US005263358A

United States Patent [19]

Center et al.

[11] Patent Number: 5,263,358

[45] Date of Patent: Nov. 23, 1993

[54] CLOSED-LOOP AIR-FUEL RATIO CONTROLLER

[75] Inventors: Marc B. Center, Royal Oak; Norman Maasshoff, Warren, both of Mich.; Aparicio J. Gomez, Bertrange, Luxembourg

[73] Assignee: General Motors Corporation, Detroit, Mich.

[21] Appl. No.: 843,037

[22] Filed: Feb. 28, 1992

[51] Int. Cl.5 .......... G01N 27/12

[52] U.S. Cl. .......... 73/23.32

[58] Field of Search .......... 73/116, 23.32; 123/672, 123/676

[56] References Cited

U.S. PATENT DOCUMENTS

| | | | |
|---|---|---|---|
| 4,278,060 | 7/1981 | Isobe et al. | 123/440 |
| 4,344,317 | 8/1982 | Hattori et al. | 73/23 |
| 4,953,351 | 9/1990 | Motz et al. | 123/676 X |

*Primary Examiner*—Jerry W. Myracle

*Attorney, Agent, or Firm*—Howard N. Conkey

[57] ABSTRACT

Oxygen sensor temperature and switching frequency compensation is provided to engine air-fuel ratio control, wherein the drift in the sensor voltage corresponding to stoichiometry is modeled and accounted for in the control, providing improved accuracy in conventional closed-loop engine air-fuel ratio control.

9 Claims, 2 Drawing Sheets

CLOSED-LOOP AIR-FUEL RATIO CONTROLLER

INCORPORATION BY REFERENCE

U.S. Pat. No. 4,625,698, is hereby incorporated herein by reference.

BACKGROUND OF THE INVENTION

This invention relates to closed loop air-fuel ratio control in internal combustion engines.

It is generally known that the amount of hydrocarbons, carbon monoxide and oxides of nitrogen emitted from an internal combustion engine may be substantially reduced by controlling the air-fuel ratio of the mixture admitted into the engine and catalytically treating the exhaust gases emitted therefrom. The optimum air-fuel ratio of the mixture supplied to the engine for most efficient reduction of the above described exhaust gas constituents is substantially the stoichiometric ratio. Even slight deviations from the stoichiometric ratio can cause substantial degradation in the reduction efficiency. Accordingly, it is important that precise control of the air-fuel ratio be maintained.

Conventional closed-loop air-fuel ratio control systems provide, by definition, feedback as to the actual air-fuel ratio of the mixture supplied to the engine, such as with the common zirconia oxide $ZrO_2$ oxygen sensor disposed in the exhaust path of the engine. The $ZrO_2$ sensor provides a high gain, substantially linear measurement of the oxygen content of the exhaust gas which, in a well known manner, may be translated into information on the actual ratio of fuel to air admitted into the engine. The translated information is used to make on-line corrections to the air-fuel ratio control. As such, it is important that accurate information on the actual air-fuel ratio be provided by the oxygen sensor.

Applicants have found that the $ZrO_2$ sensor output predictably varies as the temperature of the sensor varies and as the frequency of the sensor varies. Accordingly, the accuracy of the feedback mechanism and, in turn, the accuracy of the air-fuel ratio tends to degrade as the temperature and switching frequency deviate away from a design temperature and switching frequency.

Conventional systems do not compensate for variations in $ZrO_2$ sensor temperature and frequency and, as such, may be limited in their air-fuel ratio control accuracy.

SUMMARY OF THE INVENTION

It is the general object of this invention to provide compensation for variations in the accuracy of oxygen sensors, especially $ZrO_2$ sensors, in automotive air-fuel ratio control systems.

It is a further object of this invention to monitor the temperature and switching frequency of oxygen sensors in automotive air-fuel ratio control systems, and, in response thereto, to adjust the basal "stoichiometric switchpoint" which is the voltage or voltage range corresponding to a stoichiometric air-fuel ratio, above which the air-fuel ratio is classified as rich, and below which it is classified as lean. The switch point is adjusted in direction to provide a more accurate characterization of the stoichiometric point, so as to improve the accuracy of the air-fuel ratio control and in turn, the capacity of the system to reduce undesirable exhaust gas constituents.

BRIEF DESCRIPTION OF THE ILLUSTRATIONS

DESCRIPTION OF THE PREFERRED EMBODIMENT

U.S. Pat. No. 4,625,698, is hereby incorporated herein by reference. This patent describes generally a system for closed loop air-fuel ratio control wherein a required fuel injection pulse width is calculated based on the mass airflow through the cylinders of the engine determined from the measured manifold absolute pressure and the volume of the cylinders, the known injector flow rates and the desired air-fuel ratio.

The calculated pulse width is trimmed when the engine operating conditions are such that it is desired to operate "closed loop" in a manner so as to drive the actual air-fuel ratio to the stoichiometric ratio to maximize the conversion efficiency of the three way catalytic converter. To this end, a proportional correction is determined using the status of a fast filtered air-fuel ratio term FF, and an integral correction is determined using the status of a slow filtered air-fuel ratio term SF.

The status of FF is determined by comparing FF to a region centered around a threshold value $K_F$ which represents the oxygen sensor voltage corresponding to stoichiometry. Likewise, the status of SF is determined by comparing SF to a region defined by $K_{21}$ and $K_{22}$, which represent oxygen sensor voltages corresponding to a rich air-fuel ratio voltage threshold and a lean air-fuel ratio voltage threshold, respectively. These two values are set at a voltage amount above and below the voltage corresponding to stoichiometry, respectively.

Under closed loop operation, the conventional oxygen sensor such as a $ZrO_2$ sensor located in the exhaust path of the engine provides information indicating the actual engine air-fuel ratio. Conventional air-fuel ratio control systems operate in a manner that presupposes an oxygen sensor that is substantially accurate over variations in sensor temperature and sensor switching frequency.

Figure 1:
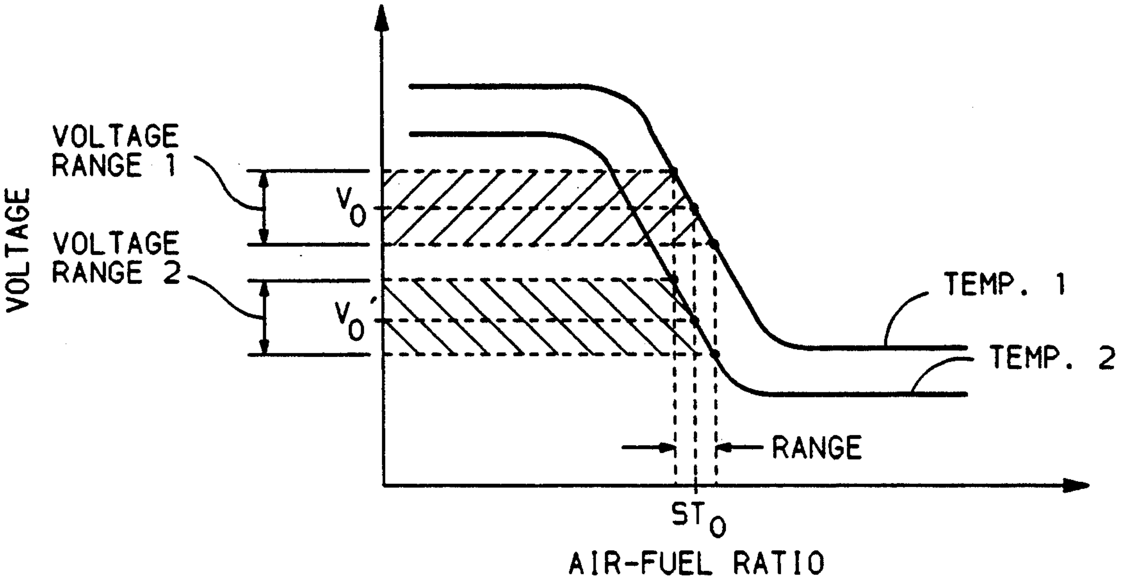
FIG. 1 illustrates generally the effect of a temperature change on a typical oxygen sensor "S" curve.

It has been determined that there is a significant drift in the $ZrO_2$ sensor output voltage for a given engine air-fuel ratio based on two factors, sensor temperature and sensor switching frequency. As illustrated in FIG. 1, the $ZrO_2$ characteristic "S" curve can substantially vary with changes in temperature, for example from the design temperature "temp1" position to a position corresponding to a second temperature "temp2". As can be seen from FIG. 1, the "S" curve displacement that results from the change in temperature will, unless compensated for, result in control inaccuracies, in that the uncompensated control will attempt to drive the sensor voltage to a point within the illustrated "voltage range 1" whereas the illustrated "voltage range 2" is more truly indicative of the range corresponding to stoichiometry.

Accordingly, the present invention monitors changes in operating temperature and, based on predetermined relationships between changes in temperature and the corresponding variation in the "S" curve for the sensor used in the application, adjusts the values that the sensor voltage is compared to, so as to more accurately characterize the air-fuel ratio as rich or lean.

Figure 2:
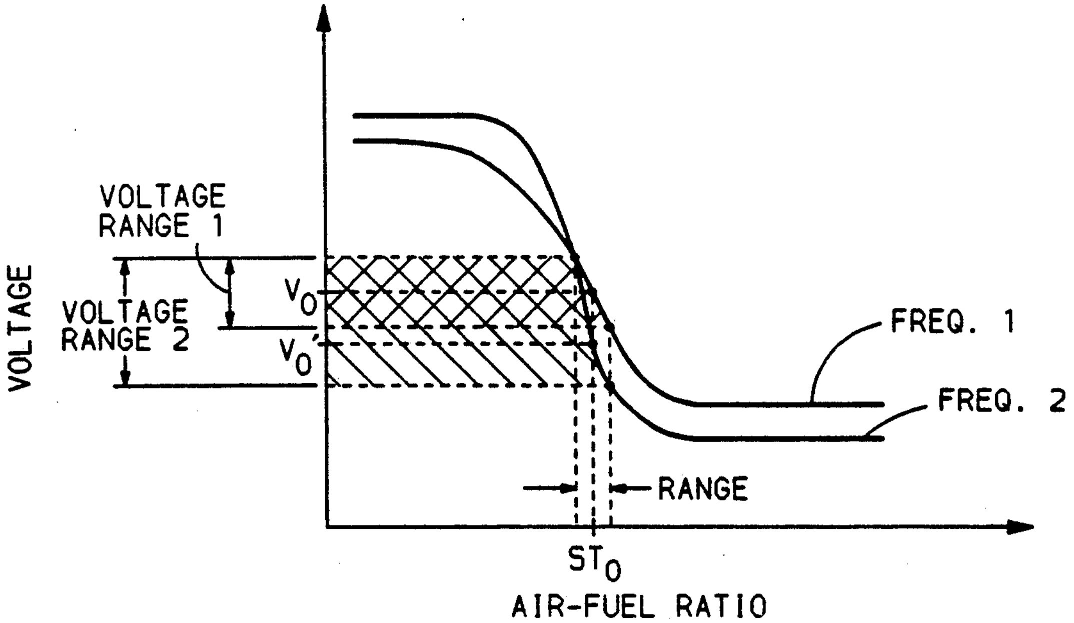
FIG. 2 illustrates generally the effect of a switching frequency change on a typical oxygen sensor "S" curve.

The second factor affecting the accuracy of the $ZrO_2$ sensor is sensor switching frequency, which may be described as the time rate at which the sensor output voltage alternates between voltages corresponding to a rich condition and voltages corresponding to a lean condition. As illustrated in FIG. 2, the $ZrO_2$ characteristic "S" curve can substantially vary with changes in frequency, for example from the design frequency "freq1" position to a position corresponding to a second frequency "freq2". As can be seen from FIG. 2, the "S" curve displacement that results from the change in frequency will, unless compensated for, result in control inaccuracies, in that the uncompensated control will attempt to drive the sensor voltage to a point within the illustrated "voltage range 1" whereas the illustrated "voltage range 2" is more truly indicative of the range corresponding to stoichiometry.

Accordingly, the present invention monitors changes in sensor switching frequency and, based on predetermined relationships between changes in frequency and the corresponding variation in the "S" curve for the sensor used in the application, adjusts the values that the sensor voltage is compared to, so as to more accurately characterize the air-fuel ratio as rich or lean.

The present invention, the steps of which are illustrated in the following FIGS. 3 and 4, takes the above described variations into account by adjusting at least one of the threshold values of $K_F$, $K_{21}$ and $K_{22}$ in response to sensed changes in oxygen sensor temperature and oxygen sensor switching frequency. As such, the system closed loop compensation operates around a stoichiometric region less sensitive to changes in temperature and switching frequency, and provides a more robust overall air-fuel ratio control. The routines of FIG. 3 and 4 are embodied in, and executed by a digital computer, such as that illustrated in FIG. 2 of the incorporated reference.

After proceeding through the following compensation routines, comparison of the adjusted threshold values to FF and SF may be carried out in any conventional manner, such as is illustrated in the reference incorporated herein.

Figure 3:
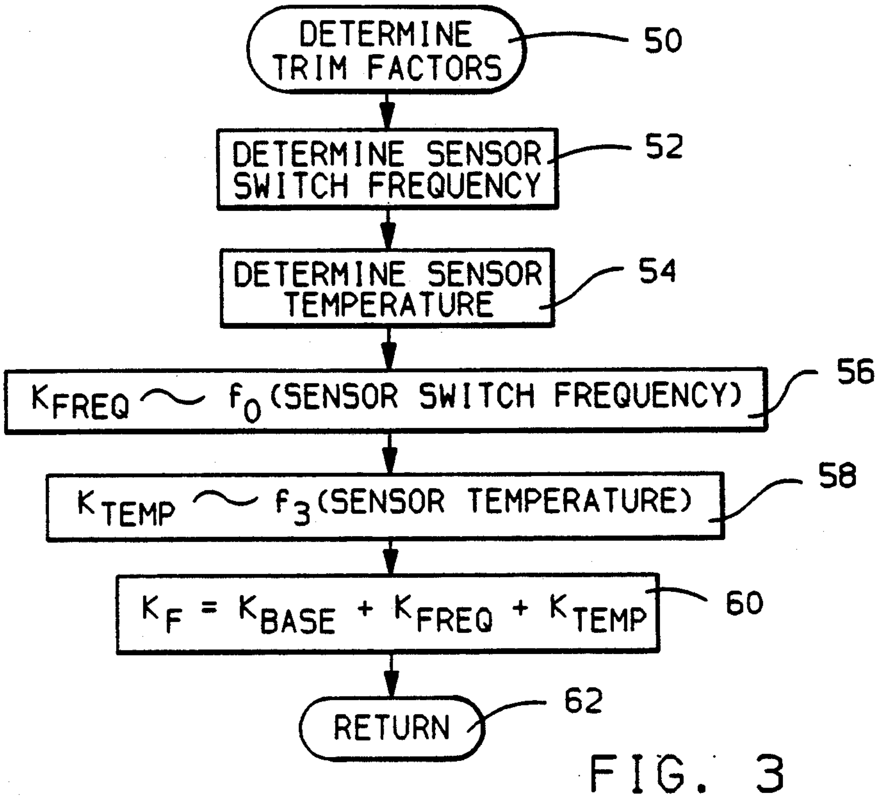
FIG. 3 is a computer flow diagram illustrating the operation of a routine incorporating the principles of this invention in accord with a first embodiment.
Figure 4:
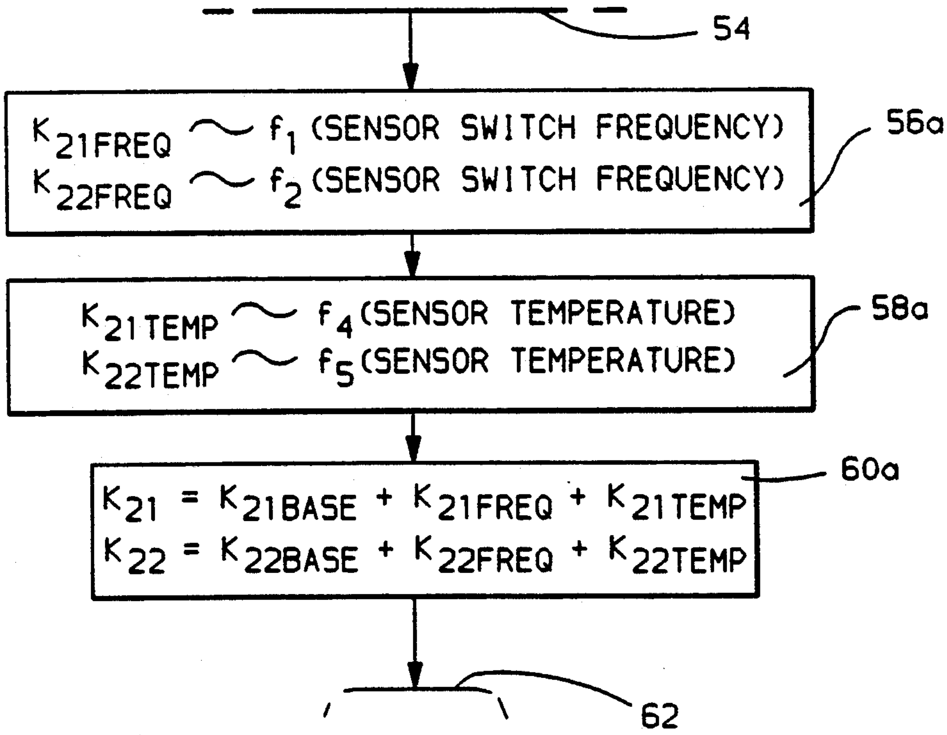
FIG. 4 is a computer flow diagram illustrating the operation of a routine incorporating the principles of this invention in accord with a second embodiment.

First, the routine in accord with the principles of this invention determines necessary temperature and frequency compensation factors, via the routine of FIG. 3. The routine is entered at step 50, and proceeds to step 52, where the switching frequency of the oxygen sensor is determined in any conventional manner, such as by recording the number of sensed switches between a rich and lean oxygen condition over a recent predetermined period of time.

The routine then proceeds to step 54, where the temperature of the oxygen sensor is sensed or estimated, such as by measuring the temperature of the engine exhaust gas passing by the sensor. The temperature information is communicated to and stored in the engine controller volatile memory.

As described earlier, it has been determined that the sensor output voltage corresponding to stoichiometry varies with sensor switching frequency. To compensate for this, at least one of the three threshold values is adjusted by an amount related to the manner in which the $ZrO_2$ sensor used in the application is found to vary with frequency variations. To carry out this adjustment in the first embodiment, a frequency compensation value $K_{FREQ}$ is determined at step 56 as a predetermined function of the sensed switching frequency of the oxygen sensor, for example using a conventional lookup table, with switching frequency as the lookup value, and values of $K_{FREQ}$ as the ordered value.

As in many such lookup tables, a discrete number of ordered pairs are in the table. Values between those in the table may be referenced via interpolation, using the closest two sets of ordered pairs. In the predetermined $K_{FREQ}$ table, the entries are determined as voltage adjustment values indicative of the variation in the sensor output voltage with frequency. The magnitude of the voltage adjustment values is approximately the same as the magnitude of the deviation in the voltage corresponding to stoichiometry, for example, the difference between $V_o$ and Vo' in FIG. 2. In the first embodiment, $K_{FREQ}$ is ultimately added to $K_F$, so as to provide a sum substantially indicative of the true basal stoichiometric switchpoint of the oxygen sensor, in the face of the above described frequency effects.

Returning to FIG. 3, after determination of $K_{FREQ}$, the routine proceeds to step 58, to determine $K_{TEMP}$, the predetermined temperature compensation value, in a manner analogous to that used to determine $K_{FREQ}$. $K_{TEMP}$ may be determined using a conventional table lookup with temperature of the oxygen sensor as the lookup value and $K_{TEMP}$ as the ordered value, in the manner described for the $K_{FREQ}$ lookup table.

$K_{TEMP}$ is used to compensate for variations in the oxygen sensor voltage corresponding to stoichiometry due to temperature changes of the sensor. $K_{TEMP}$ values stored in the lookup table are determined as being the amount of change in the stoichiometric voltage away from a design voltage, for example the change from Vo to Vo' in FIG. 1, due to a variations in temperature. As was discussed in the case of $K_{FREQ}$, $K_{TEMP}$ will be added ultimately to at least one of the threshold values before they are compared to a filtered version of the sensor output. The resulting sum should then be indicative of the true stoichiometric switchpoint of the sensor in the face of variations in temperature.

Returning to FIG. 3, after determining $K_{TEMP}$, in accord with a first embodiment, the routine proceeds to step 60, to incorporate sensor frequency and temperature effects into $K_F$, which is the threshold value corresponding to a stoichiometric air-fuel ratio, according to the following equation $$K_F = K_{BASE} + K_{FREQ} + K_{TEMP}$$

where $K_{BASE}$ represents a stoichiometric ratio in the absence of the above described temperature and frequency effects (the stoichiometric switchpoint at the design frequency and temperature). As illustrated in the U.S. Pat. No. 4,625,698 incorporated herein by reference, the fast filtered oxygen sensor reading will be compared to $K_F$ for a determination as to whether the air-fuel ratio is rich or lean and, per the adjustments made herein at step 60, a more accurate determination can be given over a range of temperatures and switching frequencies. After determining $K_F$, the routine proceeds to step 62, to return to the calling routine.

In a second embodiment, rather than compensate $K_F$, the fast filtered oxygen sensor reading, it has been determined that beneficial compensation can be provided by compensating $K_{21}$ and $K_{22}$, the slow filtered threshold values which, in the U.S. Pat. No. 4,625,698, incorporated herein by reference, are used to determine the status of the slow filtered air-fuel ratio signal SF. This status is used in the determination of the integral correction in the closed loop adjustment of the fuel provided to the engine.

Like the stoichiometric switchpoint variations described above, the sensor voltages indicative of the stoichiometric range, which is a window around the stoichiometric switchpoint as defined by $K_{21}$ and $K_{22}$, have been found to vary predictably with changes in oxygen sensor temperature and sensor switching frequency. Accordingly, by characterizing the changes in the lower bound voltage defining the range and the upper bound voltage further defining the range, and by properly adjusting these voltages, an air-fuel ratio control with improved accuracy over changes in temperature and frequency can be provided.

Accordingly, in this second embodiment, to compensate for changes in the voltage range corresponding to a stoichiometric range, so as to substantially nullify the effects of changes in temperature and frequency thereon, the steps 56a through 60a of FIG. 4 can be substituted into the routine of FIG. 3 for the steps 56 through 60.

Specifically, the routine in accord with the second embodiment proceeds from step 54 of the routine of FIG. 3, to step 56a of the routine of FIG. 4, to determine $K_{21FREQ}$ as a function of the sensor switching frequency as determined at step 52, and to determine $K_{22FREQ}$ also as a function of the sensor switching frequency. It should be noted that, as indicated in FIG. 4 at step 56a, the functions used to determine $K_{21FREQ}$ and $K_{22FREQ}$ are not necessarily the same function, nor are they necessarily related to the functions used to determine other adjustment values, such as those described at steps 56, 58, or 58a.

The values determined at this step 56a may be referenced from a lookup table, with frequency as the lookup value. The values stored in the table may be determined in a calibration step, wherein variations in the indication of the voltage range corresponding to a stoichiometric ratio range may be monitored over controlled changes in frequency, such as was described at step 56 of the routine of FIG. 3.

After determining the frequency adjustment values at step 56a, the routine advances to step 58a, to determine the temperature adjustment values $K_{21TEMP}$ and $K_{22TEMP}$, both as a function of the temperature sensed at step 54 of the routine of FIG. 3. As was described in the determination of the frequency adjustment values, and as is indicated at step 58a, each of the temperature adjustment values may be determined via distinct functions, such as by performing a separate calibration of the temperature effects on $K_{21}$ and $K_{22}$, and by storing the calibration results in tabular form in memory, for table lookup using temperature as the reference value. The temperature compensation values determined at this step correspond to the amount of variation in the lower and upper bound voltages corresponding to the stoichiometric range due to the present temperature as determined at step 54, such as was described at step 58 of the routine of FIG. 3.

The routine next moves to step 60a, where $K_{21}$ and $K_{22}$ are adjusted according to the following equations $$K_{21}=K_{21BASE}+K_{21FREQ}+K_{21TEMP}$$

$$K_{22}=K_{22BASE}+K_{22FREQ}+K_{22TEMP}$$

where $K_{21BASE}$ and $K_{22BASE}$ represent constant lower and upper bound values defining a window of predetermined width around the voltage corresponding to the stoichiometric ratio at the design frequency and temperature. The bounds of this window are thus made variable in this embodiment so as to compensate for the above described variations in the indication of the stoichiometric voltage window due to temperature and frequency effects. Accordingly, a more accurate indication of the oxygen sensor voltages corresponding to a rich or lean engine air-fuel ratio for comparison with the slow filtered air-fuel ratio signal SF is provided.

In a third embodiment, both the fast filtered threshold compensation of the first embodiment and the slow filtered threshold compensation of the second embodiment may be combined in a single embodiment, so as to provide compensation affecting both the proportional gain and the integral gain in the closed loop adjustment of the fuel provided to the engine. Such compensation may be provided by appending steps 56a through 60a of the routine of FIG. 4 to the routine of FIG. 3, after step 60 of that routine, and before step 62, so that appropriate adjustment of $K_F$, $K_{21}$ and $K_{22}$ is provided.

The foregoing description of a preferred embodiment and a second and third embodiment for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. An apparatus for determining the air-fuel ratio of an internal combustion engine, comprising:

oxygen content determining means for determining engine exhaust gas oxygen content;

means for ascertaining a frequency at which the determined engine exhaust gas oxygen content switches between a first predetermined content range and a second predetermined content range;

means for sensing the temperature of the oxygen content determining means; and means for determining an air-fuel ratio of the internal combustion engine as a function of the engine exhaust gas oxygen content, the frequency at which the engine exhaust gas oxygen content switches between the first and second predetermined content ranges, and the temperature of the oxygen content determining means.

2. The apparatus of claim 1, wherein the first and second predetermined content ranges are contiguous, with a boundary therebetween being defined by a predetermined basal value, the predetermined basal value being adjusted as a predetermined function proportional to the frequency at which the engine exhaust gas oxygen content switches between the first and second predetermined content ranges, and as a predetermined function proportional to the temperature of the oxygen content determining means.

3. The apparatus of claim 1, wherein the first and second predetermined content ranges have a predetermined window disposed therebetween, the predetermined window being defined by an upper value which is a first predetermined magnitude greater than a predetermined basal value, and by a lower value which is a second predetermined magnitude less than the predetermined basal value.

4. The apparatus of claim 3, further comprising:

means for adjusting the predetermined basal value as a predetermined function of the frequency at which the engine exhaust gas oxygen content switches between the first and second predetermined content ranges, and as a predetermined function of the temperature of the oxygen content determining means.

5. The apparatus of claim 3, further comprising:

means for adjusting the at least one of a group consisting of the first predetermined magnitude and the second predetermined magnitude, the adjustment being related to a predetermined function proportional to the frequency at which the engine exhaust gas oxygen content switches between the first and second predetermined content ranges, and further being related to a predetermined function proportional to the temperature of the oxygen content determining means.

6. A method for determining the air-fuel ratio of an internal combustion engine, comprising the steps of:

determining the engine exhaust gas oxygen content;

ascertaining the frequency at which the engine exhaust gas oxygen content switches between a first predetermined content range and a second predetermined content range;

sensing the temperature of exhaust gas in the engine; and determining an air-fuel ratio of the internal combustion engine as a function of the engine exhaust gas oxygen content, the frequency at which the engine exhaust gas oxygen content switches between the first and second predetermined content ranges, and the temperature of exhaust gas of the engine.

7. The method of claim 6, further comprising the step of adjusting a predetermined basal value as a predetermined function proportional to the frequency at which the engine exhaust gas oxygen content switches between the first and second predetermined content ranges, and as a predetermined function proportional to the temperature of exhaust gas in the engine, the predetermined basal value defining a boundary between the first and second predetermined content ranges.

8. The method of claim 6, further comprising the step of adjusting a predetermined basal value as a predetermined function of the frequency at which the engine exhaust gas oxygen content switches between the first and second predetermined content ranges, and as a predetermined function of the temperature of exhaust gas in the engine, the predetermined basal value being within a predetermined window, the predetermined window being between the first and second predetermined content ranges and being defined by an upper value which is a first predetermined magnitude greater than the predetermined basal value, and by a lower value which is a second predetermined magnitude less than the predetermined basal value.

9. The method of claim 8, further comprising the step of adjusting at least one of a group consisting of the first predetermined magnitude and the second predetermined magnitude, so as to cause a change in the first and second predetermined content ranges, the adjustment being related to a predetermined function proportional to the frequency at which the engine exhaust gas oxygen content switches between the first and second predetermined content ranges, and further being related to a predetermined function proportional to the temperature of exhaust gas in the engine.

* * * * *